Figure 1:
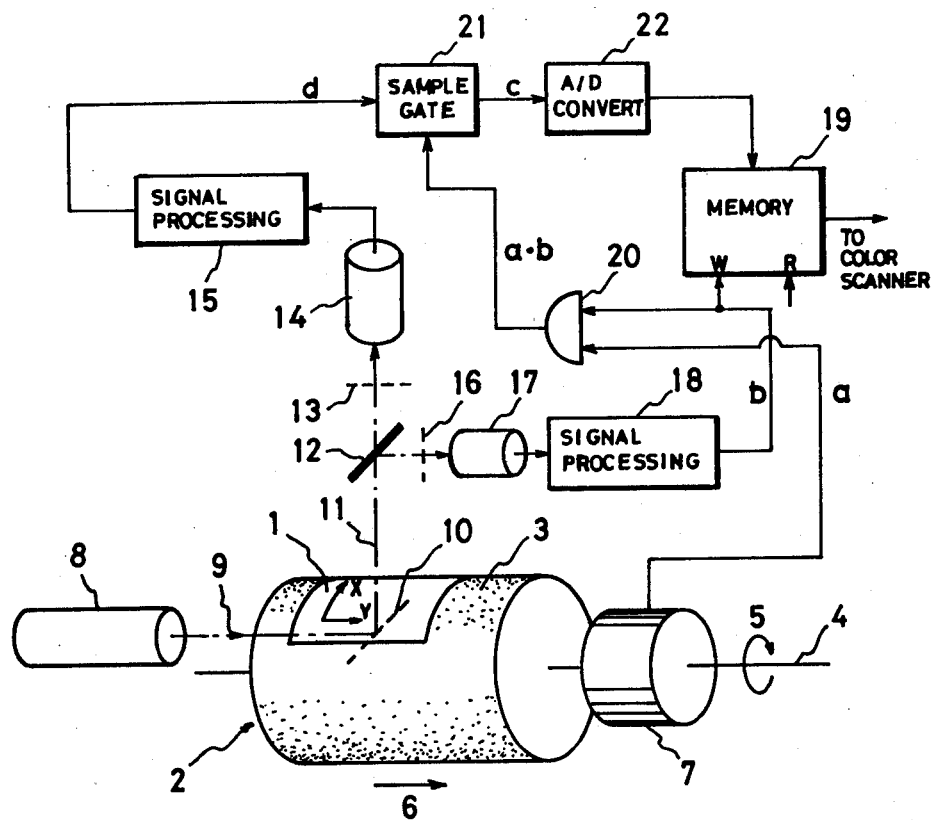

United States Patent [19]

Konagaya

[11] 4,451,855
[45] May 29, 1984

[54] RELATION DENSITY CALCULATION SYSTEM

[75] Inventor: Masahiko Konagaya, Kobe, Japan

[73] Assignee: Konan Camera Research Institute, Hyogo, Japan

[21] Appl. No.: 299,590

[22] Filed: Sep. 4, 1981

[30] Foreign Application Priority Data

Sep. 9, 1980 [JP] Japan ................................ 55-125623

[51] Int. Cl.³ ........................ H04N 1/06; H04N 1/40
[52] U.S. Cl. .................................... 358/289; 358/280
[58] Field of Search ............... 358/280, 294, 285, 292, 358/80, 290, 289, 75; 382/65, 66, 67, 68; 364/525, 526

[56] References Cited

U.S. PATENT DOCUMENTS

| | | | |
|---|---|---|---|
| 3,013,115 | 12/1961 | Takahashi | 358/280 |
| 3,529,078 | 9/1970 | Murata | 358/75 |
| 3,893,166 | 7/1975 | Pugsley | 358/80 |
| 3,894,178 | 7/1975 | Pugsley | 358/80 |
| 4,189,741 | 2/1980 | Klopsch | 358/80 |

FOREIGN PATENT DOCUMENTS

1400806  7/1975  United Kingdom ................. 358/80

*Primary Examiner*—Errol A. Krass
*Assistant Examiner*—Clifford L. Tager
*Attorney, Agent, or Firm*—Eugene E. Geoffrey, Jr.

[57] ABSTRACT

A relative density calculation system, principally and preferably used with a color scanner, for detecting a surrounding frame of a photographic transparency to be scanned to produce signal information for application to the color scanner to be utilized in density correction process to remove the density error caused by the presence of the surrounding frame, the frame detection being effected by scanning the transparency with an infrared-ray beam which can pass the deepest colored portion of the transparency but not the surrounding frame material.

3 Claims, 2 Drawing Figures

RELATION DENSITY CALCULATION SYSTEM

This invention relates to the field of color scanners and the like, and particularly, to a device for preventing a density distribution error due to the presence of a dark frame surrounding an original image or photographic transparency to be scanned from adversely affecting the density correction process utilizing information produced by the scanner.

The color scanner is a device used for preparation of color printing blocks from a color photographic transparency and is described, for example, in the article of Yoshio Ono, "OVERVIEW OF COLOR SCANNERS;" Jour. Jap. Soc. Image Electronics, Vol. 9, No. 2 (1980) pp. 93–101. In the color scanner, a color photographic transparency is scanned with a visible light beam, so-called "flying spot," and the transmitted light beam is separated into colors and converted into electric color signals. In order to compensate for the difference in density range between photography and printing, these electric signals are then subjected to correction processes such as logarithmic compression, density correction and contrast control, which are based upon the overall density distribution information of the photograph. When the photographic transparency is surrounded by a dark or light-shielding frame, however, it may be misread as a deep-colored portion of the transparency to produce erroneous density distribution information which can result in disturbance of the correction processes.

Accordingly, an object of this invention is to provide a novel system for detecting the surrounding frame to produce error correction information to be applied to the color scanner for removing the abovementioned disturbance.

This invention contemplates the provision of means for generating relative density calculations, which comprises means of scanning at the same time with both visible and infrared-ray beams a transparent original image surrounded by a frame consisting of a material which does not pass infrared rays, first and second photoelectric transducers for converting the visible light and infrared ray beams coming from the original image into first and second electric signals, respectively, a memory for storing the first electric signal, and means for controlling the application of the first electric signal to the memory in response to the output of the second electric signal.

These and other objects and features of this invention will be described hereinunder in more detail with reference to the accompanying drawings.

IN THE DRAWINGS

Figure 2:
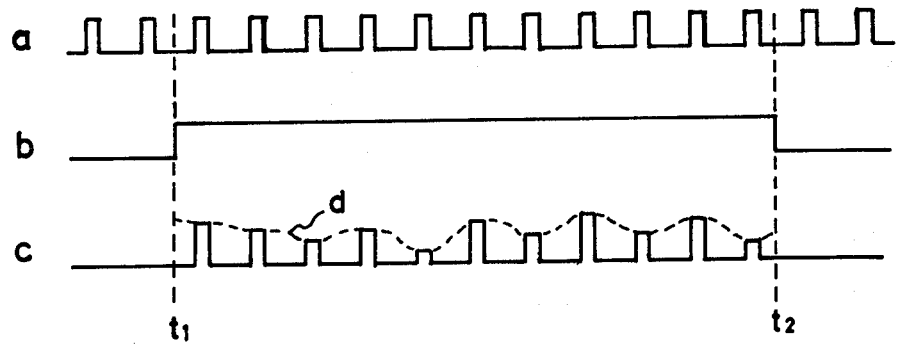

FIG. 1 is a schematic block diagram representing an embodiment of the device of this invention; and FIG. 2 is a diagram representing waveforms appearing at respective points in the device of FIG. 1.

Referring to FIG. 1, a photographic transparency 1 is wound on a cylinder 2 and the portion of the cylinder 2 other than the transparency 1 is covered with a shield 3 blocking all light including ultraviolet light. The cylinder 2 supported on a shaft 4 is rotated at high speed in the direction of arrow 5 and at the same time translated at low speed in the direction of arrow 6. The shaft 4 is provided also with a rotary code generator 7 which produces a train of pulses as shown in FIG. 2a in synchronism with the rotation of the cylinder 2.

A light house 8 includes a light source, such as an incandescent lamp, which can emit a light beam encompassing visible light and infrared rays, and projects such light beam into the cylinder 2 along a path 9 which is substantially parallel to the axis of rotation 4. The light beam is reflected at about a right angle by a mirror 10 located in the cylinder 2 and projected onto the inner wall of the cylinder 2.

When the transparency 1 is in the reflection path 11 of the beam, it transmits the beam which is then halved by a half-mirror 12. The light beam having penetrated the half-mirror 12 passes an infrared ray blocking filter 13 and is received by a photoelectric transducing element 14 which produces a corresponding output signal. The light beam is also reflected by the half-mirror 12 and passes through a filter 16 which passes only infrared rays and is received by a photoelectric transducing element 17 which produces a corresponding output signal.

The output of the photoelectric element 14 is processed by a signal processing circuit 15 including amplifier and applied through a sampling gate 21 to an analog-digital converter 22. The converter 22 converts the input signal into digital form to write it in a memory 19.

The output of the photoelectric element 17 is processed by a signal processing circuit 18 including an amplifier and its output is applied to a "write-in" control terminal of the memory 19 and also to one input of an AND gate 20 having a second input coupled to receive the pulse output of the rotary code generator 7. The output of the AND gate 20 is coupled to a control input of the sampling gate 21.

In operation, the high speed rotation of the shaft 4 in the direction of arrow 5 and the low speed translation of the cylinder 2 in the direction of arrow 6 result in scanning of the transparency 1 with the light beam in both X and Y directions. The photographic transparency 1 changes its transmissivity of visible light significantly with its color density, while it exhibits substantially high transmission of infrared ray even in a deep-colored portion. That is, the output of the processing circuit 15 exhibits variation corresponding to the density of the transparency as shown by a dotted waveform d in FIG. 2c, while the output of the circuit 18 is relatively fixed at a substantial level within the frame as shown in FIG. 2b.

In FIG. 2, time points $t_1$ and $t_2$ corresponding to the rise edge and drop end of the output level of the circuit 18, respectively, represent the time at which the light beam scanning in the circumferential direction 5 or direction X transmits from the mask 3 to the transparency 1 and the time at which it transmits from the transparency to the mask 3, respectively.

The rotary code generator 7 is driven by a constant speed shaft and produces a train of pulses having constant frequency and pulse duration, as shown in FIG. 2a. The AND gate 20 receives, at its input, this pulse train together with the above output of the circuit 18 (FIG. 2b) and controls with its output the sampling gate 21 for the sampling of the output d (FIG. 2c) of the circuit 15. Thus, the sampled output of the sampling gate 21 is as shown by a full line waveform in FIG. 2c. This sampled signal is converted into digital form by the A/D converter 22 and stored in the memory enabled by the signal b.

The contents of the memory 19 is read out when a "read-out" signal is applied to the "read-out" control terminal R in synchronism with the operation of the color scanner (not shown) and applied thereto for determining the condition of density correction.

Though the invention has been described with reference to a single embodiment, it should be noted that various modifications and changes can be made within the scope of this invention by those skilled in the art. For example, the light beam from the light house 8 may be pulse-modulated previously with a pulse train such as shown in FIG. 2a. In this case, the output of the signal processing circuit 18 can be applied directly to the memory terminal W and the sampling gate 21, and the components 7 and 20 can be omitted. Moreover, though the photographic transparency 1 was used as the original image in transmission version, this invention can be applied also to a photographic print in reflection version.

What is claimed is:

1. A relative density calculation system for a transparent image, said image secured by a surrounding frame carried on a support drum, said system comprising: means for scanning said transparent image using both visible and infrared light, first and second transducer means responsive to said visible and infrared light passed through said transparent image, respectively, said first and second transducer means producing first and second electric signals representative of the magnitudes of said visible and infrared light, respectively, A/D converter means for digitizing said first electric signal, and memory means, responsive to said second electric signal, for storing said digitized first electric signal, whereby the content of said memory is representative of the relative density calculation of said image.

2. A relative density calculation system according to claim 1, wherein said visible and infrared light constitute a single source, such that the beam is a composite of said visible and infrared light.

3. A visible and infrared composite beam according to claim 2, wherein said composite beam is split into visible said infrared light by a half-mirror and two filters, said filters filtering infrared light and visible light, respectively.

* * * * *